UNITED STATES PATENT OFFICE.

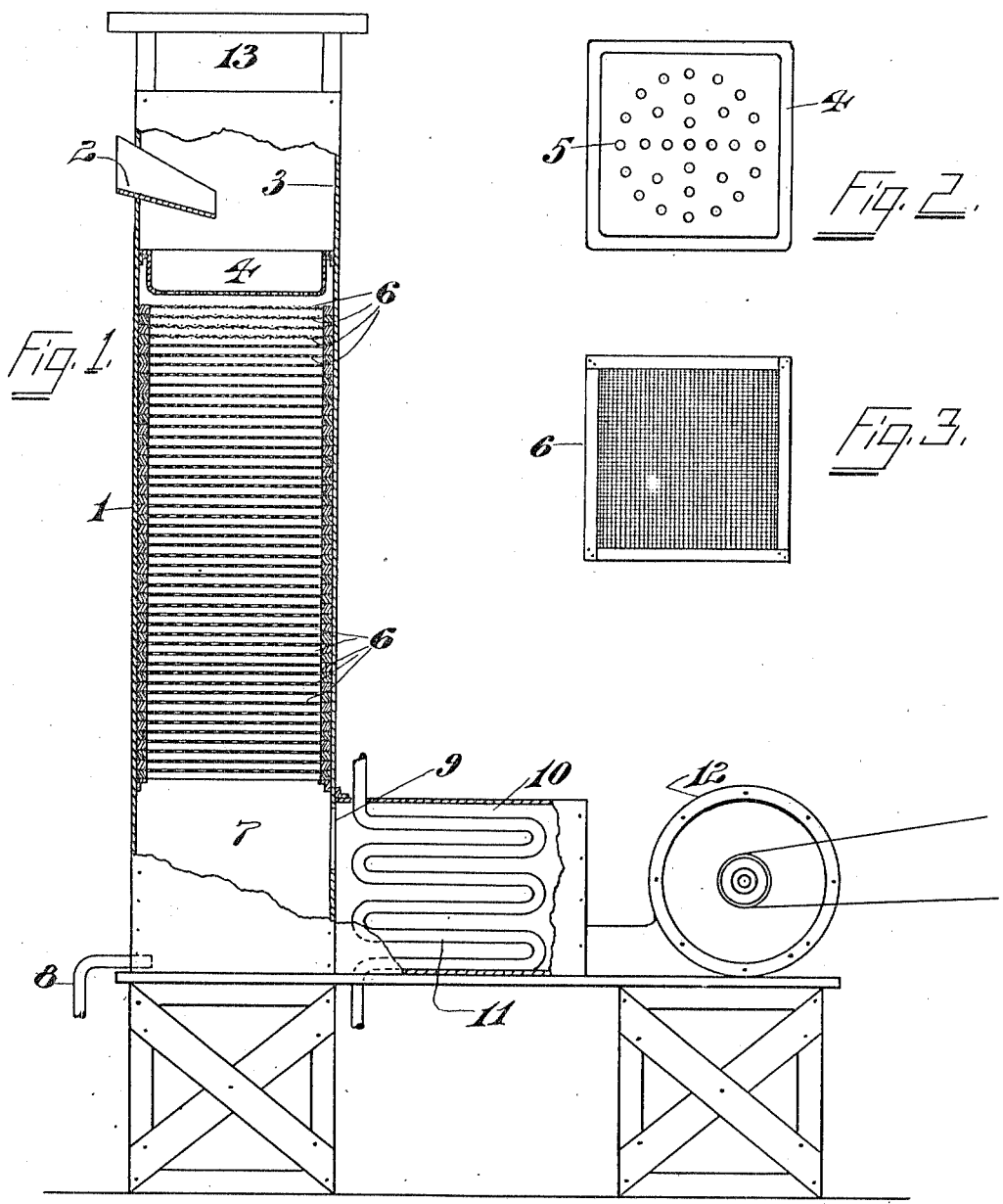

HOMER T. YARYAN, OF TOLEDO, OHIO, ASSIGNOR TO THE YARYAN NAVAL STORES COMPANY, OF TOLEDO, OHIO, A CORPORATION OF OHIO.

PROCESS FOR PURIFYING ROSIN.

1,120,007.  Specification of Letters Patent.  Patented Dec. 8, 1914.

Application filed February 24, 1913. Serial No. 750,324.

*To all whom it may concern:*

Be it known that I, HOMER T. YARYAN, a citizen of the United States, residing at Toledo, in the county of Lucas and State of Ohio, have invented certain new and useful Improvements in Processes for Purifying Rosin, of which the following is a specification.

This invention relates to a process for purifying rosin, particularly rosin which has been extracted from resinous woods by means of solvents.

The object of the invention is to provide for submitting the rosin to a final treatment for the purpose of freeing it from such substances as turpentine and pine oil which have remained in it after the extraction process has been completed.

In extracting rosin from resinous woods by means of solvents, particularly hydrocarbon solvents, and distilling off the solvents to secure the rosin, it is difficult to recover the rosin in the pure state free from other substances which would have a tendency to render it soft or tacky, owing to the fact that the solvent dissolves other substances which do not pass off in the distillation process, and this invention is intended as a last step in the process of recovering rosin in which such solvents are used and distilled off, as, for instance, as set forth in the patent to H. T. Yaryan No. 915,400.

In this process, when the solvent containing the rosin and other substances, such, for instance, as turpentine, pine oil, etc., is distilled, the rosin passes from the still in a melted condition at a fairly high temperature and passes into the apparatus herein described, which consists of a tower or column having a series of perforated trays or sieves through which the rosin is caused to fall by gravity in a finely subdivided state, and when in this condition it is treated to a current of air at a temperature above the melting point of rosin, the air being caused to circulate in the opposite direction from which the rosin is passing and thus absorb or drive off these substances, such as the heavier pine oil, which are not taken off by the distillation process, leaving the rosin free therefrom and of a harder and more superior quality than when passed direct from the still into barrels or receiving receptacles.

In the accompanying drawings,—Figure 1 is a partial vertical sectional view of an apparatus in which this step of the process is performed. Fig. 2 is a top plan view of the receiving perforated pan located at the top of the tower. Fig. 3 is a top plan view of one of the perforated trays through which the rosin passes in order to subdivide it and also to permit the passage of the air in the opposite direction.

Like parts are represented by similar characters of reference throughout the several views.

In the said drawings, 1 represents the tower or column proper; 2 is a trough or spout by which the rosin is fed to the upper part, 3, of the tower from the still, where it falls into the upper pan, 4, from whence it passes through the orifices, 5, in the bottom of said pan onto the first of a series of trays, 6. Each of these trays 6 is formed preferably of a frame covered with screen wire of a suitable fine mesh to permit the air and rosin to pass in opposite directions therethrough until the rosin reaches the lower part, 7, of the tower, from which it passes through the pipe, 8, into a suitable receiving receptacle (not shown). The chamber, 7, has an opening, 9, in the side thereof which communicates with a heating chamber, 10, in which is located a steam coil, 11, connected to any suitable source of steam supply to maintain it at a temperature above the melting point of rosin. At the opposite side of this chamber 10 is a blower, 12, of any suitable construction, which forces the air through the chamber 10 and around the steam coil and into the chamber 7 at the lower part of the coil, where it is caused to circulate upwardly through the perforated trays in the opposite direction from that in which the rosin passes, so that the finely subdivided rosin is brought into contact with this heated air and the impurities left from the distillation process driven off and permitted to escape through the opening, 13, at the top of the tower. If desired, of course, the vapors which are thus carried off can be condensed and such substances that they contain of value, such as pine oil or the heavier turpentine, may be recovered. It is evident that the circulation of air through the tower may be accomplished by making the tower of sufficient height to create a natural draft.

Having thus described my invention, I claim:—

1. As a final step in the process of recovering rosin from resinous woods by solvents, the subjecting of the rosin while hot to the action of a current of air at a temperature above the melting point of rosin while the rosin is in a finely subdivided state.

2. As a final step in recovering rosin, the process of causing the rosin while hot to flow through a series of screens to finely subdivide it, and subjecting the finely subdivided rosin to a current of air at a temperature above the melting point of said rosin.

3. As a final step in recovering rosin, the process of admitting the rosin while hot at the top of a receptacle, causing said rosin to fall by gravity through a series of screens in said receptacle to finely subdivide it, and subjecting the finely subdivided rosin to the action of a current of air at a temperature above the melting point of said rosin entering the bottom of said receptacle and escaping at the top.

In testimony whereof, I have hereunto set my hand this 30th day of January 1913.

HOMER T. YARYAN.

Witnesses:
 H. S. YARYAN,
 M. S. GROVES.